May 14, 1957 J. B. KER 2,792,177
CALCULATOR FOR PREDICTING MENSTRUAL CYCLES
Filed Aug. 28, 1955 2 Sheets-Sheet 1
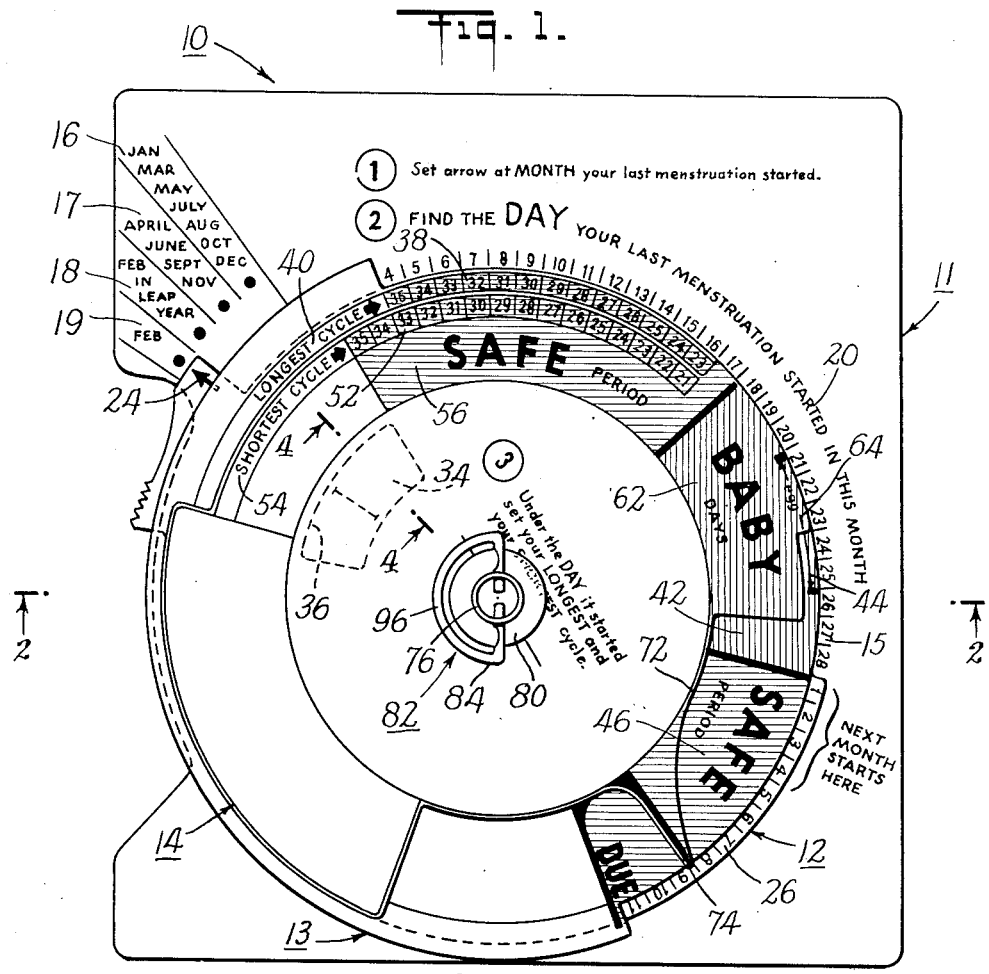
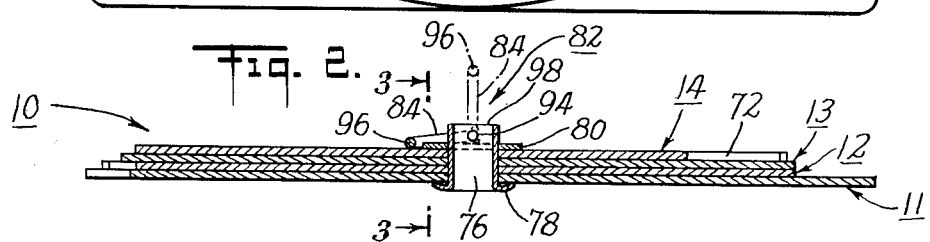
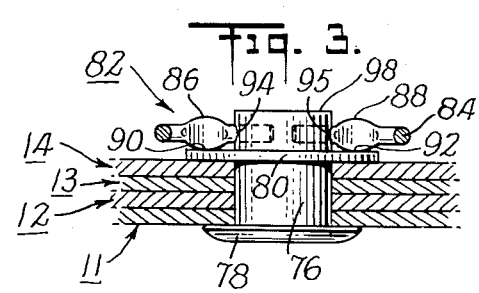
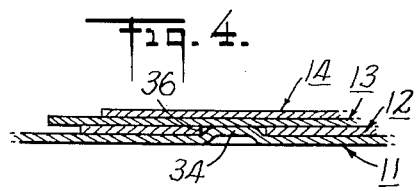
INVENTOR
John B. Ker
BY
Curtis, Morris + Safford
ATTORNEYS May 14, 1957

J. B. KER 2,792,177

CALCULATOR FOR PREDICTING MENSTRUAL CYCLES

Filed Aug. 28, 1955

INVENTOR
John B. Ker
BY
Curtis, Morris + Safford
ATTORNEYS

United States Patent Office 2,792,177
Patented May 14, 1957

2,792,177

CALCULATOR FOR PREDICTING MENSTRUAL CYCLES

John B. Ker, New York, N. Y.

Application April 28, 1955, Serial No. 504,457

12 Claims. (Cl. 235—88)

This invention relates to calculators for predicting sterile and fertile periods in a menstrual cycle.

The object of my invention is to provide a calculator which clearly and accurately interprets the record of past menstrual cycles to indicate probable fertile and sterile periods in the next menstrual cycle despite some irregularity of the menstrual periods. It is an accepted medical fact that most women have at least some irregularity in their menstrual periods.

A further object of my invention is to provide a calculator adapted upon suitable adjustment, to indicate essential facts concerning a given menstrual cycle, and so simple to use and read that even the relatively unskilled and untrained can use the device successfully.

A further object is to provide a calculator which will accurately take into account the variations in the length of the various months and the occurrence of leap years.

A further object is to provide a calculator which will indicate the probable period within which ovulation will take place so that conception can be more effectively planned.

A further object is to provide a calculator which can be set for a particular menstrual cycle and then locked in adjusted position for as long as desired. This lock must be simple to operate and easily enough manufactured to not increase greatly the cost of manufacturing the calculator.

A further object is to provide a calculator which will indicate the probable interval during which the next menstruation will start.

A further object is to provide a calculator which is complete within itself and does not involve the use of extra pieces which could easily be lost.

A further object is to provide a calculator small enough to be conveniently carried about in a handbag or pocket.

A further object is to provide a calculator simple enough to manufacture so that it may be produced in large quantities at a relatively inexpensive cost.

As first shown by Doctors Ogino and Knaus and now generally accepted in the gynecological profession, ovulation occurs at a specific interval (usually 14 to 16 days) before the onset of the next expected menstruation. In determining the probable fertile period, the life of the ovum and the life of the sperm must also be taken into consideration. The rhythm method is discussed in "The Safe Period" by Dr. Abraham Stone of the Margaret Sanger Research Bureau, a pamphlet distributed by the Planned Parenthood Federation of America.

Accurate prediction of the beginning of ovulation is important both for avoiding conception, when for medical or sociological reasons it is undesirable or dangerous, and for assuring conception at desired times, i. e., "planned parenthood." Such prediction is based on calculation using the records of previous periods. It is an object of my invention to facilitate and assure the accuracy of such calculations.

My invention contemplates at least three platforms, at least two of which are movable relative to the third and to each other and each of which carries a scale. The scales of the two movable platforms are read against each other and cooperate to provide a linear or curvilinear edge adjacent to a scale of a third platform. In the drawings and description these platforms are generally circular dials but the invention may also be used with straight-edged or other geometrical forms of scale-carriers.

In this specification and the accompanying drawings I have set forth one embodiment of my invention and have suggested various modifications and alternatives. It should be understood that these are not intended to be exhaustive or limiting of the invention, but on the contrary are given with a view to enabling others not only to practice my invention, but so fully to understand it and the principles thereof that they will be enabled readily to modify and adapt these examples and to embody the invention in many forms, each as may be best adapted to the conditions of a particular use.

Other objects and advantageous features of the invention will be apparent from the description and claims and the accompanying drawings in which:

Figure 1 is a top plan view of the assembled invention which illustrates the operation of the invention when a two day irregularity in menstrual cycles is present.

Figure 2 is a sectional view taken on line 2—2 of Figure 1 showing a cross-section of the locking element.

Figure 3 is a sectional view taken on line 3—3 of Figure 2 showing the locking element in its locked position.

Figure 4 is a sectional view taken on line 4—4 of Figure 1 showing a cross-section of the detent stop device.

Figure 5:
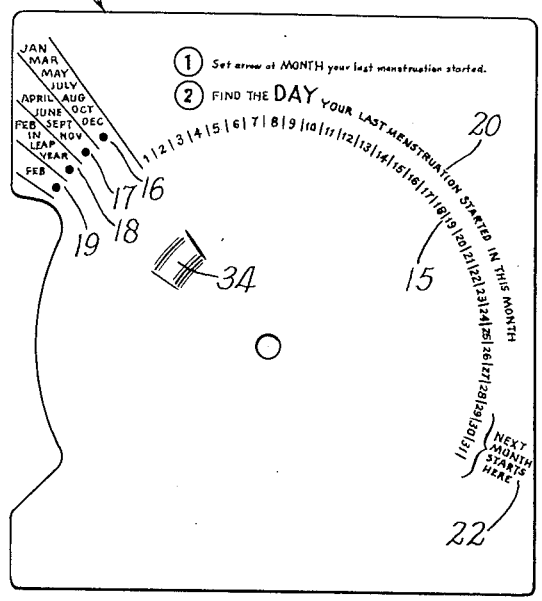
Figure 6:
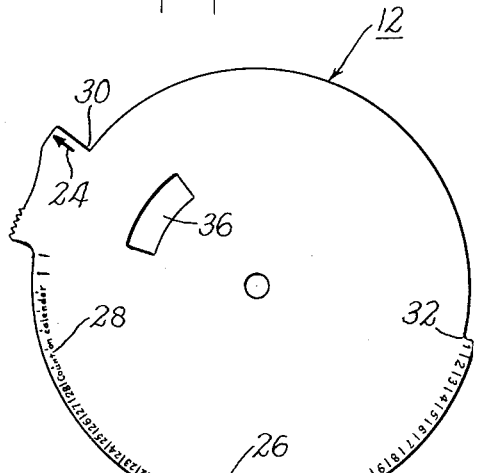
Figure 7:
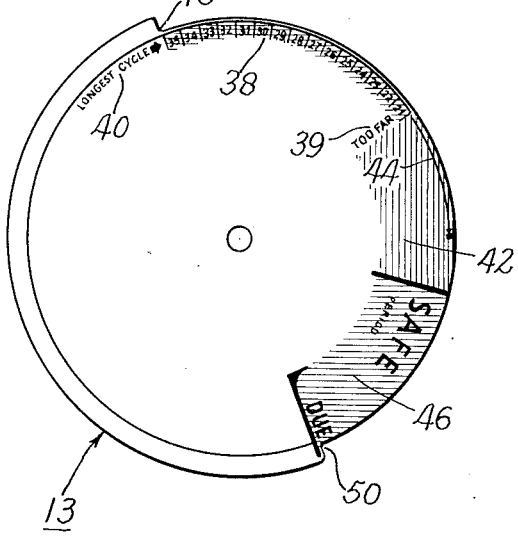
Figure 8:
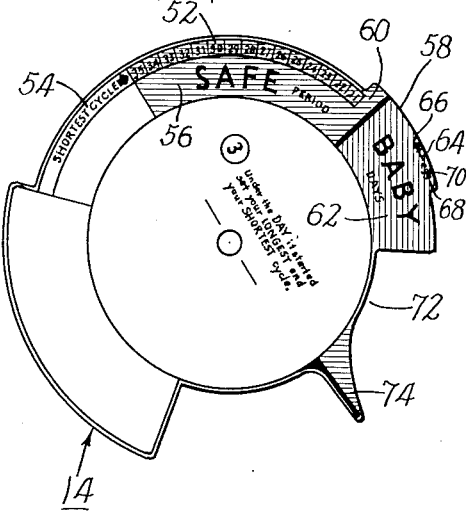

Figure 5 is a top plan view of the base.
Figure 6 is a top plan view of the lowermost dial.
Figure 7 is a top plan view of the intermediate dial.
Figure 8 is a top plan view of the uppermost dial.

The calculator herein described is constructed from a stiff sheet material, advantageously an opaque plastic. The invention may be used on a straight or circular or other type slide rule, and with transparent scale carriers as well as opaque.

The calculator consists ideally of two or three dials mounted for coaxial rotation on a base with a locking device. In the drawings, the calculator 10, as shown in Figure 1, is comprised of a base 11 (Figure 5), a lowermost dial 12 (Figure 6), an intermediate dial 13 (Figure 7), and an uppermost dial 14 (Figure 8). An arcuate scale 15 of numbers from 1 to 31 is printed on the base 11 (Figure 5), and in a unit 16 which precedes the "1" of the scale and is equal to units of the 1 to 31 scale, the months having 31 days are listed. Next to the 31 day months unit 16 is a similar unit 17 listing the 30 day months. Similarly, units 18 and 19 are marked to indicate February in a leap year and February in a normal year.

The base 11 also contains words 20 indicating that one unit of the scale on the base will be selected to represent the day the user's last menstruation started. By the scale units marked "29," "30," and "31" there is an indication 22 that a new month starts.

The lowermost rotatable dial 12 (Figure 6) has a pointer 24 movable with said dial to point to any of the four unit spaces indicating various months on the base. At a point on the diameter of the dial spaced around the circumference a distance equal to 31 days on the base scale from the pointer, there is a semi-circular scale 26 with numbers from 1 to 28 and additional blank spaces 28 in the scale for counting above 28, all of these units being equal to the units of the base scale. The scale ascends in the same direction as the scale 15. The dial 12 is cut back from the scale and the pointer portion at 30 and 32 respectively.

A detent 34 on the base and a corresponding slot 36 on the lowermost dial as shown in Figure 4 may be used to limit the movement of the pointer to the area containing the four units, 16, 17, 18 and 19 whereon the four groups of months according to their length are indicated.

The scale 26 on the first dial radially overlaps the arcuate scale 15 of the base so that the "1" of the scale on the first dial covers the "31" of the scale on the base but leaves the remainder exposed when the pointer points to the space representing the 30-day months, and similarly the "1" of the scale on the first dial covers the "30" of the scale on the base but leaves the remainder exposed when the pointer points to the space representing February in leap year, and similarly the "1" of the scale on the first dial covers the "29" of the scale on the base when the pointer points, as it does in Figure 1, to the space representing 28-day Februaries.

The intermediate dial 13 (Figure 7) has thereon a scale 38 from 21 to 35 with arcuate units equal to those of the scales of the base and lowermost dial but numbered in a direction opposite from the scales of the base and lowermost dial. There is an indication 40 that this scale 38 provides a selection of cycle lengths from which the user selects the one corresponding to her longest menstrual cycle in the preceding eight or more cycles. Under the "21" of the scale 38 are the words "Too Far" 39 to warn the user that the irregularity of periods for which the dials have been set is too great for safe use of the rhythm method.

Adjacent to the "21" of the scale 38 on the intermediate dial is a distinctively colored area 42 which indicates a fertile period and extends along the edge of the dial for a distance equal to ten scale units. A thin line 44 just inside the rim of the dial extends from the beginning of the fertile period area adjacent to the scale along the rim of the dial to a point equal to three scale units before the end of the fertile period area. Next to this is an area 46 indicating a sterile or "Safe" period which extends along the edge of the dial for a distance equal to eleven scale units. This sterile period area is colored to distinguish it both from the distinctively colored fertile period area and the other portions of the calculator. The color selected for the "Safe" period is also used for the scale 38 on the intermediate dial. The sterile period area is marked "Safe period" and at the end of it farthest from the fertile period area the word "Due" is printed to indicate the probable occurrence of the next menstruation as determined by the longest cycle.

The intermediate dial 13 covers the base scale 15 and the lowermost dial 12 but is cut back at the scale and fertile and safe areas at 48 and 50 respectively.

The uppermost dial 14 (Figure 8) also has a scale 52 from 21 to 35 with units equal to those of the scales of the base and lowermost and intermediate dials but numbered in the same direction as the scale of the intermediate dial and in an opposite direction from the scales of the base and lowermost dial. There is an indication 54 that this scale 52 provides a selection of cycle lengths from which the user selects the one corresponding to her shortest menstrual cycle in the preceding eight or more cycles. On the dial by the scale 52 the words "Safe period" appear. The scale area 56 is colored to correspond to the scale 38 and the sterile period area 46 of the intermediate dial 13.

The uppermost dial 14 has an arcuate extension 58 adjacent to the "21" of its scale 52. This arcuate extension 58 is equal to ten scale units. An area 60 equal to one scale unit is of the same color as the scale area 56. The remaining area 62 which is equal to nine scale units is of the same color as the fertile area 42 of the intermediate dial 13.

The fertile area 62 has a thin line 64 just inside the rim of the dial. This thin line 64 extends from a point 66 located three unit spaces away from the beginning of the fertile area to another point 68 located three unit spaces away from the end of the fertile period area. The word "egg" 70 is printed near the thin line 64 to indicate that the line predicts the time of ovulation. The fertile period area 62 is slightly cut back from the point 68 to the end of the fertile area. This fertile area is labeled "Baby days." The portion of the dial adjacent to the fertile area is cut away to provide a window 72 through which the intermediate dial 13 is seen.

At a distance equal to ten scale units from the end of the fertile area 62 on the uppermost dial 14 the window 72 is interrupted by a pointer 74 which indicates the probable occurrence of the next menstruation as determined by the shortest cycle. The pointer 74 is of the same color as the other sterile areas, scale 38, sterile period 46, scale 52 and scale area 56.

The fertile area 62 on the uppermost dial 14 overlies the fertile area 42 of the intermediate dial 13 so that when any number of the longest cycle scale 38 on the intermediate dial 13 is radially aligned with the same number of the shortest cycle scale 52 on the upper dial 14, and then the dials are moved to register a variation between the longest and shortest cycles, the fertile area 42 of the intermediate dial will become increasingly visible through the window 72 in the uppermost dial and the two areas 42 and 62 together will have the appearance of a visual unit.

In Figure 1 the calculator 10 is set for a menstrual cycle wherein the last menstruation started on February 10th in a normal year and the longest cycle is 29 days and the shortest cycle is 27 days. The pointer 24 is set for February in a normal year and the "29" on the longest cycle scale 38 and the "27" of the shortest cycle scale 52 are aligned with the "10" of the base scale 15.

Setting the pointer 24 at February in a normal year causes the scale 26 of the lowermost dial 12 to cover the "29," "30" and "31" of base scale 15. Setting the "29" of the longest cycle scale 38 under the "10" of the base scale 15 moves the end of the fertile area 42 on the intermediate dial 13 to the line separating the "28" and "29" of base scale 15. This setting also moves the end of the ovulation line 44 of the intermediate dial 13 to the line separating the "25" and "26" of the base scale 15. Similarly, this setting of the longest cycle scale moves the end of the sterile area 46 on intermediate dial 13 and the word "Due" printed thereon to the "11" of the scale 26 of the lowermost dial. Setting the "27" of the shortest cycle scale 52 under the "10" of the base scale moves the beginning of the fertile period 62 on the uppermost dial 14 to the "18" of the base scale. This setting also moves the beginning of the ovulation line 64 of fertile area 62 to the line separating the "20" and "21" of the base scale. Similarly, this setting of the shortest cycle scale moves the pointer 74 to the line separating the "8" and "9" of the scale 26 of the lowermost dial. A portion of the fertile area 42 of the intermediate dial 13 equal to two scale units is visible through the window 72 and with fertile area 62 of the uppermost dial 14 produces a visual unit of an eleven day fertile period. Similarly, a portion of the ovulation line 44 of the intermediate dial 13 equal to two scale units is visible and produces an ovulation line equal to five scale units.

The positioning of the parts as described above indicates to the user that the sterile period in her cycle will continue through February 17th and that the fertile period will begin on February 18th and continue until February 28th, with ovulation occurring from the 21st to 25th of February inclusive. Her second sterile period of the cycle will begin on March 1st and her next menstruation is expected on March 9th, 10th or 11th.

Dials 12, 13 and 14 are mounted on base 11 by means of a center stud 76 with a supporting flange 78 at its lower end as shown in Figue 2. A washer 80 is placed on top of dial 14 and the entire arrangement is secured by a lock 82.

Lock 82 which is shown in cross-section in Figure 3 consists of a bail 84 pivoted on a transverse axis on the center stud 76. The bail 84 has cam projections 86, 88, 90 and 92. These cam projections are located so that when the bail is positioned with its ends through holes 94 and 95 in the center stud 76 and the loop 96 of the bail is above the projecting end 98 of center stud 76, the cam projections 86, 88, 90, and 92 will be released from the dials. But when bail 84 is pressed flat against the dials on either side of center stud 76, two of the cam projections will engage and clamp the dials.

The bail 84 may have less than the four cam projections described and the cam projections may be formed by flattening either one or both sides of the bail strip or wire or they may be added to the surface of the bail strip or wire. The bail may be made from metal or any suitable plastic.

Washer 80 which is placed between the uppermost dial and the lock may be omitted. Washers may be used between the other dials if desired.

The calculator may have attached to the base a calendar chart whereon the user may keep a record of her menstrual periods. Either on the back of the base or on an attached flap a further discussion of the rhythm method or other information may be printed.

It may also be desired to print information on the basal body temperature method of determining the time of ovulation and to explain how the calculator aids in the use of this method by predicting the first sterile period which precedes the ovulation in the cycle and by reducing the number of days on which it is necessary to determine the basal body temperature to a minimum.

What is claimed is:

1. A calculator for computing menstrual cycles, comprising a base 11 and dials 12, 13 and 14 mounted for coaxial rotation on said base, said base having thereon an annular scale 15 of numbers from 1 to 31 approximating and not more than a semi-circle to represent the days of a first month; and radially preceding said first month scale, in the four scale units preceding the "1," spaces 16, 17, 18 and 19 on the scale, representing, respectively, the 31 day months, the 30 day months, February in leap year, and February in a normal year; the lowermost 12 of said rotatable dials having a pointer 24 to point to any of said four spaces, and an approximately semi-circular scale 26 with numbers consecutive in the same direction as on said base scale 15 from 1 to 28 and additional blank spaces 28 in the scale for counting above 28, to represent days of a second month and any days in a third month, said second month scale 26 overlapping said first month scale 15 beginning at a point on said dial spaced circumferentially a distance equal to 31 days on said scale from said pointer, and leaving said first month scale exposed to view in said spacing, whereby the "1" of said second month scale covers the "31" of the first month scale but leaves the remainder exposed when said pointer 24 points to the space 17 representing the 30-day months, and similarly the "1" of the second month scale covers the "30" of the first month scale when said pointer points to the space 18 representing February in leap year, and similarly the "1" of the second month scale covers the "29" of the first month scale when the pointer points to the space 19 representing 28 day Februaries, the intermediate 13 and uppermost 14 of said dials having scales 38 and 52 numbered consecutively in a direction opposite to the first month scale 15 with numbers representing the various lengths of menstrual cycles, angularly corresponding, and radially adjacent, to the scales of the lower dial and the base and distinctive areas indicating respectively sterile and fertile periods; the top dial having portions overlapping and hiding portions of said distinctive areas on the intermediate dial and having windows in other areas through which distinctive areas on the dials are visible.

2. A calculator for computing menstrual cycles, comprising a base and at least two additional dials mounted for coaxial rotation on said base, said base having thereon an adjustable annular scale of numbers representing the days of two months with means to adjust the scale for months of less than 31 days, the two additional dials having scales angularly, and radially adjacent to the base scale, numbered consecutively in a direction opposite to the base scale with numbers representing the various lengths of menstrual cycles; the uppermost dial having a distinctive area equal to a number of spaces on the base scale representing at least the maximum life of an ovum plus the maximum life of a sperm and a window circumferentially beyond said distinctive area, and the lower dial having a similarly distinctive area equal to a number of spaces on the base scale representing the maximum variation, in days, of the date of release of the ovum, these two distinctive areas together indicating a fertile period, said distinctive area on the upper dial being adapted to overlap that on the lower dial and the distinctive area on the lower dial being adapted to be moved into said window so that when any number of the longest cycle scale on the lower dial is radially aligned with the same number of the shortest cycle scale on the upper dial, the distinctive area appears to be extended as the dials are moved to register a larger number of days' variation between the longest and shortest cycles.

3. A calculator as defined in claim 1 in which said pointer is carried on a radial extension of said lowermost dial, with a roughened edge portion to provide a convenient finger grip.

4. A calculator for computing menstrual cycles which comprises a plurality of scale carriers connected together for predetermined movement, of their respective scales along each other; one of said carriers having a scale with equal units marked thereon designated for the days of a month from 1 to 31 and four equal units, one designated for the 31 day months, a second being designated for the 30 day months, a third for 29 day leap year Februaries, and a fourth for 28 day Februaries; a second of said carriers bearing an indicator adapted to register respectively with any of the last-named units designated for the respective months and also bearing a second calendar day scale with equal units marked thereon aligned with the first-named day units, whereby, upon relative movement of said scale carriers said day scales may be overlapped to bring the first day unit of one adjacent to the 28th, 29th, 30th or 31st day unit of the other, said second calendar day scale having 28 consecutive units designated for the first 28 days of a second calendar month following that represented by the first calendar day scale and additional consecutive units representing the last days of the second month when said indicator is registered with any of the units designated for the 29, 30 or 31 day months, or the first days of a third month, if said indicator is registered with the unit designated for a 28 day February; third and fourth scale carriers bearing respectively menstrual period scales with equal unit markings consecutively designated with the normal lengths in days of menstrual cycles, in opposite sequence from the calendar day scales, said menstrual period scales being arranged laterally adjacent, said third and fourth scale corners each bearing distinguished areas designated for infertile periods positioned to move along the said day scales in indicating relation thereto, and adjacent distinguished areas designated for a probably fertile period positioned to move along the said day scales in indicating relation thereto, the fertile areas of both these carriers being adapted to overlap or to be extended relative to each other by relative movement of said carriers and an indicator on each of the third and fourth carriers designated for the end of the menstrual cycle and respectively spaced from the respective units of the length of cycle scale a number of units substantially equal to the designated period length.

5. A calculator as defined in claim 4 in which the lower dial has at the point where its scale ends and the area indicating fertility begins an indication that the irregularity of periods for which the dials have been set is too great for safe use of the rhythm method, so that when the difference between the longest and shortest cycle is over the variation which safely permits use of the rhythm method, the upper wheel is moved back far enough for this warning to be visible to the user.

6. A calculator for computing menstrual cycles which comprises a plurality of scale carriers connected together for predetermined movement, of their respective scales along each other; one of said carriers having a scale with equal units marked thereon designated for the days of a month from 1 to 31 and four equal units, one designated for the 31 day months, a second being designated for the 30 day months, a third for 29 day leap year Februaries, and a fourth for 28 day Februaries; a second of said carriers bearing an indicator adapted to register respectively with any of the last-named units designated for the respective months and also bearing a second calendar day scale with equal units marked thereon aligned with the first-named day units, whereby, upon relative movement of said scale carriers said day scales may be overlapped to bring the first day unit of one adjacent to the 28th, 29th, 30th or 31st day unit of the other; third and fourth scale carriers bearing respectively menstrual period scales with equal unit markings consecutively designated with the normal lengths in days of menstrual cycles, in opposite sequence from the calendar day scales, said menstrual period scales being arranged laterally adjacent, said third and fourth scale carriers each bearing distinguished areas designated for infertile periods positioned to move along the said day scales in indicating relation thereto, and adjacent distinguished areas designated for a probably fertile period positioned to move along the said day scales in indicating relation thereto, the fertile areas of both these carriers being adapted to overlap or to be extended relative to each other by relative movement of said carriers and an indicator on each of the third and fourth carriers designated for the end of the menstrual cycle and respectively spaced from the respective units of the length of cycle scale a number of units substantially equal to the designated period length.

7. A calculator for computing menstrual cycles, comprising a base and at least two additional dials mounted for coaxial rotation on said base, said base having thereon an adjustable annularly arranged scale of numbers representing the calendar days of two months with means to adjust the scale for months of less than 31 days, the two additional dials having scales angularly, and radially adjacent to the base scale, numbered consecutively in a direction opposite to the base scale with numbers representing the various lengths of menstrual cycles; said lowermost dial having a scale which permits selection of a date representing the duration of the longest menstrual cycle, said scale having adjacent thereto a distinctive area extending for a distance equal to a number of spaces on the base scale representing at least the maximum variation between the longest and shortest menstrual cycles, which distinctive area extends circumferentially of the dial with an indication that it represents a fertile period, and circumferentially adjoining said area another distinctively different area extending for a distance equal to a number of spaces on the base scale representing the sterile period between the end of the fertile period and the beginning of the next anticipated menstruation, said distinctively different area extending circumferentially of the dial with an indication that it represents a sterile period; said uppermost dial having beside its scale, which represents the shortest cycle, a distinctive area not more than a number of spaces on the base scale representing the shortest fertile period to be indicated, said distinctive area extending circumferentially on the dial with an indication that it represents a fertile period; said distinctive area on the uppermost dial overlying that on the lowermost dial so that when any number of the longest cycle scale on the lower dial is radially aligned with the same number of the shortest cycle scale on the upper dial, and then the dials are moved to register a variation between the longest and shortest cycles, the distinctive area on the lowermost dial will become increasingly visible through a window in the upper dial and the two distinctive areas will have the appearance of a visual unit.

8. A menstrual calculator as defined in claim 7 in which the distinctive fertile period areas on the upper and lower dials have a distinctive characteristic in common whereby the fertile period area on the upper dial and the extending fertile period area on the lower dial appearing through said window appear together as an extended fertile period indication.

9. A calculator as defined in claim 7 wherein an indicator is located in the window on the uppermost dial at a distance representing approximately nineteen days after the beginning of the fertile period, said indicator being adjacent to the calendar scale on the base and extending across the sterile period area of the lower dial to indicate the earliest date at which the next menstrual period should be expected to begin.

10. A calculator as defined in claim 7 wherein the distinctive area on the lower dial which represents the sterile period after ovulation has thereon near its end an indication of the latest date on which the next menstruation is anticipated.

11. A calculator for computing menstrual cycles, comprising a base and at least two dials mounted for coaxial rotation on said base, said base having thereon an annular scale of numbers representing the calendar days of at least two consecutive months, each of said dials having along a portion of its rim a scale numbered consecutively in a direction opposite to the scale of the base with numbers representing the various lengths of menstrual cycles, with arcuate units corresponding to those of the base scale, the lower dial having a distinctive area equal to a number of units of the base scale representing at least the number of days variation in occurrence of fertile periods to be indicated, and the upper dial having a similarly distinctive area equal to a number of units of the base scale not more than the shortest fertile period to be indicated with a window adjacent to it so that, when any number of the longest cycle scale on the lower dial is moved next to any lower number of the shortest cycle scale on the upper dial, the distinctive area of the upper dial is pulled away from its position over the distinctive area on the lower dial, which it occupies when the same numbers of the scales on the lower and upper dials are adjacent to each other, and the distinctive area of the lower dial is seen through the window in the upper dial and the two distinctive areas appear as a visual unit.

12. A calculator as defined in claim 11 in which the fertile area on the upper dial has a line along a portion of the rim indicating the probable date of ovulation; a portion of the rim area being cutaway so that the distinctive area of the lower dial is visible; said distinctive area on the lower dial similarly having a line along a portion of its rim so that when the distinctive area on the upper dial is pulled back from its position over the lower dial, said two lines meet and a greater number of days are indicated as the probable date of ovulation.

References Cited in the file of this patent

UNITED STATES PATENTS

| | | |
|---|---|---|
| 1,234,758 | Heghinian | July 31, 1917 |
| 2,118,354 | Mansur | May 24, 1938 |
| 2,418,207 | Tilbrook | Apr. 1, 1947 |